United States Patent
Lee

(10) Patent No.: US 9,372,615 B2
(45) Date of Patent: Jun. 21, 2016

(54) METHOD AND APPARATUS FOR TOUCH INPUT FOR ELECTRONIC DEVICE

(75) Inventor: Sang-Cheol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 13/329,059

(22) Filed: Dec. 16, 2011

(65) Prior Publication Data

US 2012/0162084 A1  Jun. 28, 2012

(30) Foreign Application Priority Data

Dec. 28, 2010 (KR) .................. 10-2010-0136549

(51) Int. Cl.
*G06F 3/0488* (2013.01)

(52) U.S. Cl.
CPC .................... *G06F 3/0488* (2013.01)

(58) Field of Classification Search
CPC . G06F 3/04883; G06F 3/0488; G06F 3/0482; G06F 2203/0381; G06F 2203/04804; G06F 2203/04805; G06F 2203/04806; G06F 3/0481; G06F 3/04845; G06F 3/0485; G06F 3/0489
USPC .................... 345/156–184; 455/566
See application file for complete search history.

(56) References Cited

U.S. PATENT DOCUMENTS

| | | | |
|---|---|---|---|
| 6,025,827 A * | 2/2000 | Bullock et al. ................. | 715/201 |
| 6,496,182 B1 * | 12/2002 | Wong et al. .................... | 345/173 |
| 7,327,349 B2 * | 2/2008 | Robbins et al. ............... | 345/156 |
| 2003/0002874 A1 * | 1/2003 | Uesaka et al. ................. | 396/299 |
| 2004/0027392 A1 * | 2/2004 | Dunn et al. .................... | 345/810 |
| 2004/0214612 A1 * | 10/2004 | Park et al. ...................... | 455/566 |
| 2005/0195154 A1 * | 9/2005 | Robbins et al. ............... | 345/156 |
| 2006/0017694 A1 * | 1/2006 | Shikata .......................... | 345/158 |
| 2008/0077881 A1 * | 3/2008 | Gilley et al. ................... | 715/810 |
| 2008/0088602 A1 | 4/2008 | Hotelling | |
| 2008/0250319 A1 * | 10/2008 | Lee et al. ....................... | 715/716 |
| 2010/0017710 A1 * | 1/2010 | Kim et al. ...................... | 715/702 |
| 2010/0056224 A1 * | 3/2010 | Kim ............................... | 455/566 |
| 2010/0295802 A1 * | 11/2010 | Lee ........................ | G06F 1/1626 345/173 |
| 2011/0281652 A1 * | 11/2011 | Laverdiere ...................... | 463/37 |
| 2012/0056817 A1 * | 3/2012 | Griffin et al. .................. | 345/173 |
| 2012/0096373 A1 * | 4/2012 | Aguera y Arcas et al. ... | 715/764 |

FOREIGN PATENT DOCUMENTS

KR   2002-0069988   9/2002

OTHER PUBLICATIONS

Sue Chastain, Capture a Screen Shot on iPhone or iPod Touch, www.about.com, online Oct. 27, 2009.*
Phil Nickinson, Screenshots on Samsung Galaxy Tab, www.androidcentral.com Nov. 12, 2010.*
Blake Stimac, Sprint EVO 4G takes screenshots without root access, intomobile.com, May 25, 2010.*

* cited by examiner

*Primary Examiner* — Dmitriy Bolotin

(57) ABSTRACT

An apparatus and a method for a touch screen in an electronic device. The method includes determining whether a constant touch input is detected. The method also includes, when a constant touch input is detected, determining whether an input of an additional key button of the device is detected. The method further includes, when the input of the additional key button is detected, performing a second function that is different than a first function of the additional key button. Since a separate new additional function may be intuitively performed besides a unique function of the additional key button by pressing the touch screen and the additional key button together, user convenience of the device increases.

20 Claims, 3 Drawing Sheets

METHOD AND APPARATUS FOR TOUCH INPUT FOR ELECTRONIC DEVICE

CROSS-REFERENCE TO RELATED APPLICATION AND CLAIM OF PRIORITY

The present application is related to and claims the benefit under 35 U.S.C. §119(a) of a Korean patent application filed in the Korean Intellectual Property Office on Dec. 28, 2010 and assigned Serial No. 10-2010-0136549, the entire disclosure of which is hereby incorporated by reference.

TECHNICAL FIELD

The present disclosure relates to a method and an apparatus for touch input in an electronic device including a touch screen unit as a data input/output means. More particularly, the present disclosure relates to a method and an apparatus for touch input in an electronic device, provided to conveniently perform an additional function by inputting an additional key together with, but separately from, a touch screen.

BACKGROUND

With the help of remarkable development of information communication technology and semiconductor technology, various portable electronic devices are rapidly distributed and used. Mobile terminals capable of voice and video communication led to wide use of the portable electronic devices as a Motion Picture Expert Group Audio Layer-3 (MP3) player, a Portable Multimedia Player (PMP), and the like.

Recently, mobile terminal provide various functions such as multimedia, wireless Internet access, short distance wireless communication, mobile broadcast reception, and the like, besides the traditional communication functions such as voice communication and short message service (SMS). Additional developments have been recently seen in mobile terminals, such as in size, design, resolution, user interface, and the like.

Thus, there is a trend toward a mobile terminal with a touch screen that may perform data input/output together. The touch screen is a combined input and display device that performs input and output of information using one screen. The touch screen performs data output via a predetermined Liquid Crystal Display (LCD) panel. A transparent touch panel stacked on the upper portion of the LCD panel performs data input. Since such a touch screen may remove the conventional keypad (for example, an input unit that uses a mechanical metal dome), a display area may be increased and an advantage of allowing a user to intuitively manipulate the touch screen is provided. Therefore, mobile terminal manufacturers have a great interest in the touch screen, and related research and development are being performed.

An electronic device having the above-described touch screen includes various settings functions according to a user's taste, and these settings functions may be directly displayed on a main screen and easily set. However, a user may find it inconvenient to be required to enter a separate menu screen via a plurality of steps to change the menu screen. For example, to control the backlight of the touch screen, most electronic devices inconveniently require entering a settings screen and then entering a screen field to control brightness.

In addition, the electronic device usually has key buttons on a portion of the device such as a lateral side and an upper side besides the touch screen. For example, volume up/down key buttons often exist on the lateral side of the device, and a power on/off button usually exists on the upper side. However, the above-described key buttons perform only a single unique function but are not helpful in executing a function that cooperates with the touch screen.

SUMMARY

To address the above-discussed deficiencies of the prior art, it is a primary object to provide at least the advantages described below. Accordingly, an aspect of the present disclosure is to provide a method and an apparatus for touch input in an electronic device, provided to conveniently perform an additional function.

Another aspect of the present disclosure is to provide a method and an apparatus for touch input in an electronic device, provided to perform a new additional function by inputting a key button and a touch screen together in the device.

Still another aspect of the present disclosure is to provide a method and an apparatus for touch input in an electronic apparatus that increases user convenience by facilitating manipulation of an additional function that may be intuitively used.

In accordance with an aspect of the present disclosure, a touch input apparatus of an electronic device is provided. The apparatus includes a touch screen configured to perform data input and output. The apparatus also includes at least one additional key button installed at a pertinent position of the device that excludes the touch screen. The apparatus further includes a controller configured, when detecting an input of the additional key button during a constant input of the touch screen, to control to perform a second function that is different than a first function of the additional key button.

In accordance with another aspect of the present disclosure, a touch screen input method of an electronic device is provided. The method includes determining whether a constant touch input is detected. The method also includes, when the constant touch input is detected, determining whether an input of an additional key button of the device is detected. The method further includes, when the input of the additional key button is detected, performing a second function that is different than a first function of the additional key button.

In one embodiment, for discrimination from a general touch, the determining of whether the additional key button is detected is performed only when the constant touch input is performed during a predetermined time. The time may be in a range of about 0.5 second~2 seconds.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
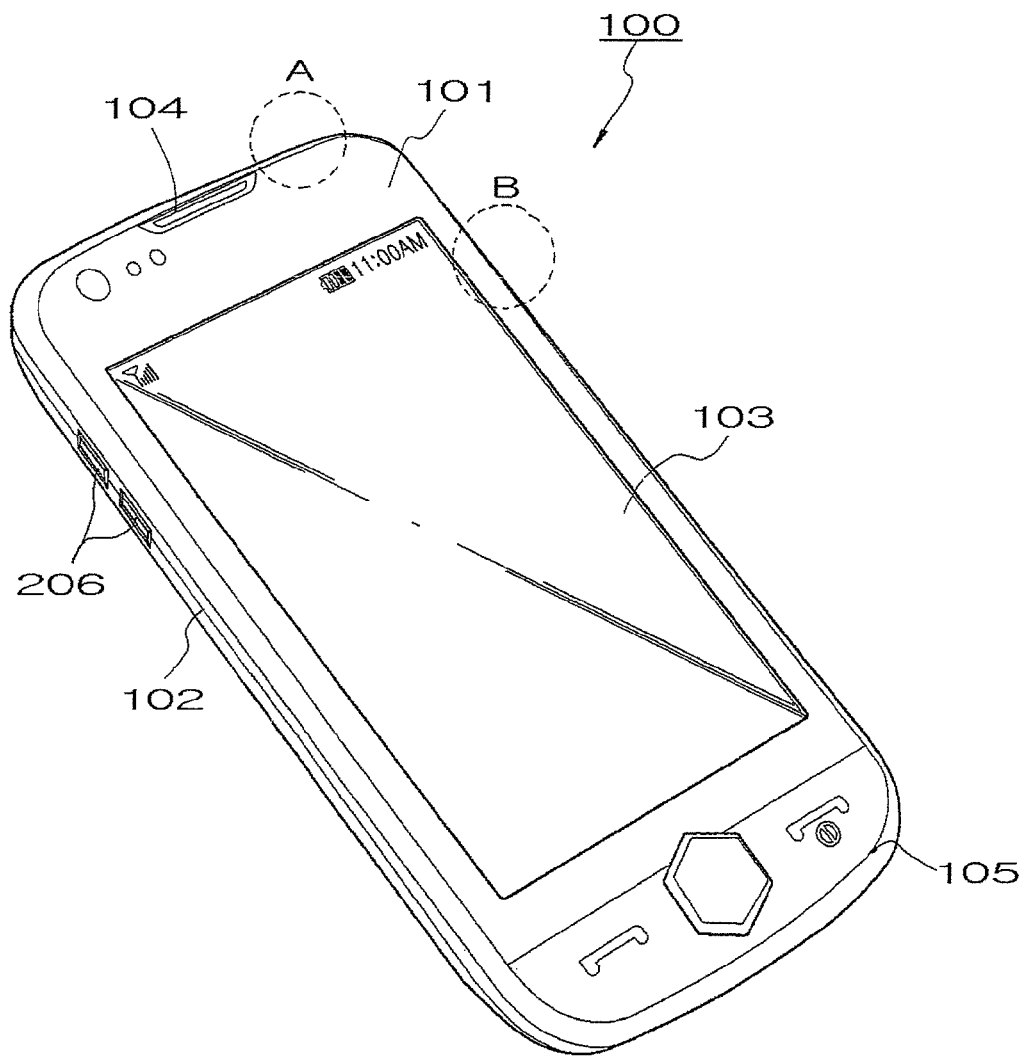
FIG. 1 illustrates a perspective view for a mobile terminal including a touch screen according to an embodiment of the present disclosure.
Figure 2:
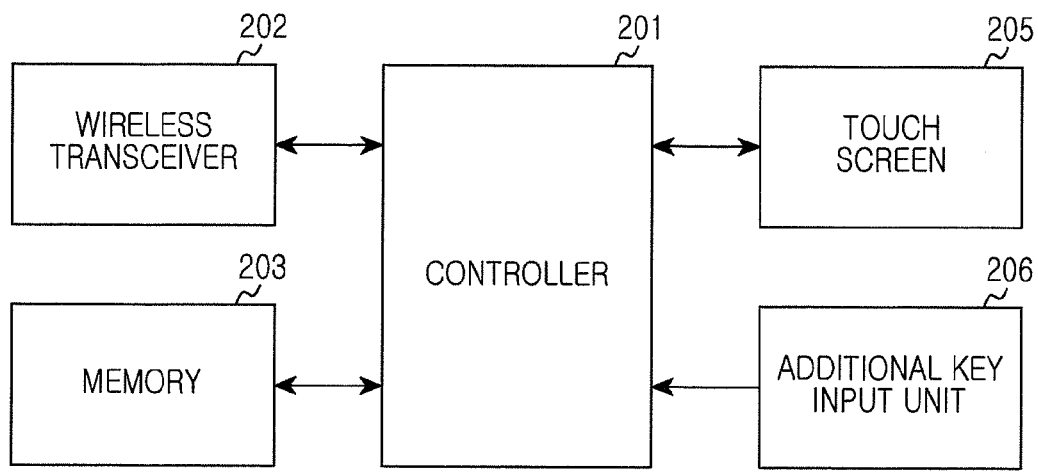
FIG. 2 illustrates a block diagram for a mobile terminal according to an embodiment of the present disclosure.
Figure 3:
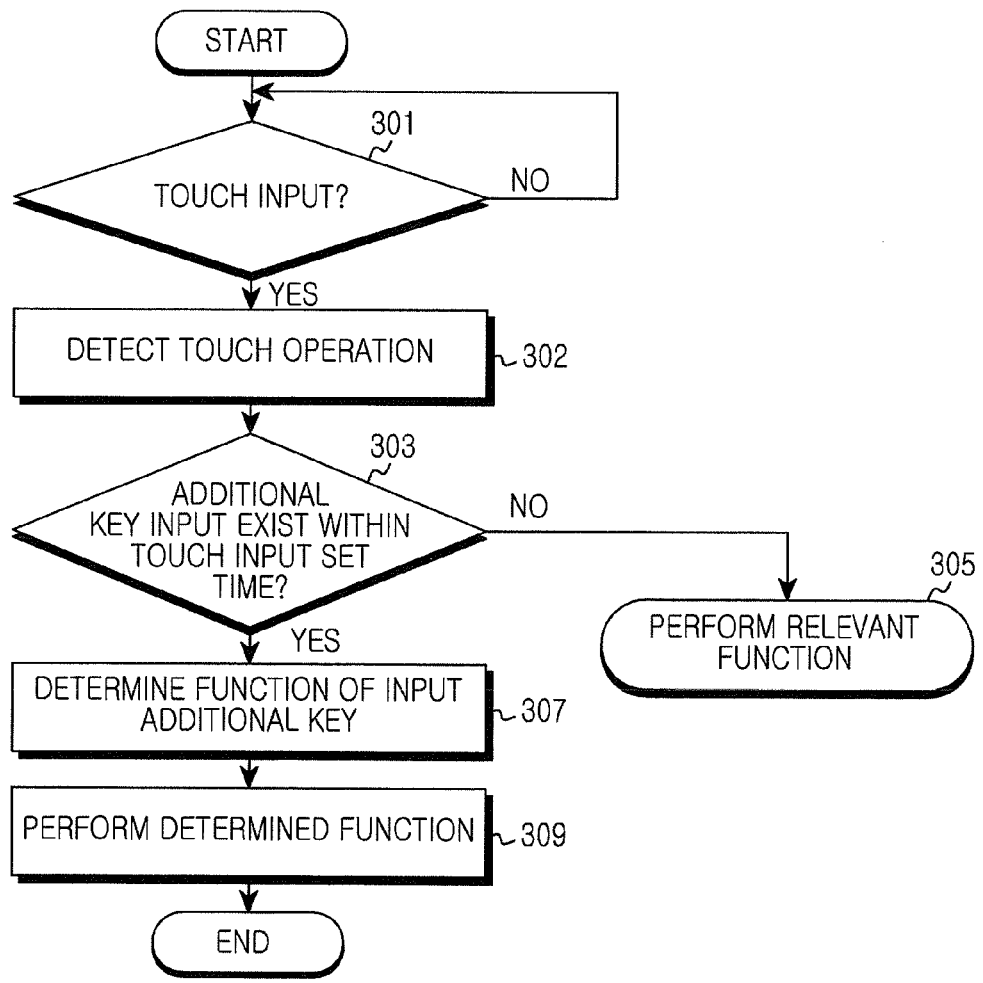
FIG. 3 illustrates a flowchart for a touch input method for performing an additional function according to an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the disclosure. Also, descriptions of well-known functions and constructions are omitted for clarity and conciseness.

FIG. 1 illustrates a perspective view for a mobile terminal including a touch screen according to an embodiment of the present disclosure. Illustration and description of an embodiment of the present disclosure are applied to a mobile communication terminal, but the present disclosure is not limited thereto. For example, the present disclosure is applicable to various electronic devices that include a touch screen as a main screen and include a key button for at least one additional function positioned at a pertinent position of the device.

As illustrated in FIG. 1, a touch screen 103 is applied to a front side 101 of the mobile terminal 100 according to an embodiment of the present disclosure. The touch screen 103 performs data input/output functions together. Though not shown, the touch screen 103 may include an LCD module as a data output unit, and include a touch panel stacked on the upper portion of the LCD module as a data input unit.

In addition, according to a characteristic of the mobile terminal, a speaker unit 104 for outputting sound may be installed on the upper portion of the touch screen 103, and a microphone unit 105 for inputting voice and sound may be installed on the lower portion.

In one embodiment, a volume up/down key button 206 is installed on the lateral side of the mobile terminal 102 as an additional key button that allows a user to conveniently use the button intuitively without separately entering a menu. In addition, a key button that may turn on or turn off power of the mobile terminal 100 may be installed on the portion A of FIG. 1, and a key button that may change the mobile terminal from a sleep mode to an active mode may be installed on the portion B.

According to an embodiment of the present disclosure, a new function that may be intuitively used and performed when specific key buttons (e.g., the additional key buttons 206, a key button of the portion A, a key button of the portion B, and key buttons excluding the front touch screen) are pressed with the touch screen 103 touched.

For example, with the touch screen 103 touched, the brightness of the touch screen 103 may be controlled using the volume up/down key button 206. In addition, when a button of the portion A is pressed with the touch screen 103 touched, a screen currently displayed on the touch screen is captured and automatically stored. In addition, the Internet may be executed. That is, additional functions that are convenient when intuitively used but that may require entering a plurality of menus in the conventional art may be used in a simple method.

FIG. 2 illustrates a block diagram for a mobile terminal according to an embodiment of the present disclosure. The mobile terminal includes a controller 201, a wireless transceiver 202, a memory 203, a touch screen 205, and an additional key input unit 206.

During reception, the wireless transceiver 202 down-converts a Radio Frequency (RF) signal received via an antenna and despreads and channel-decodes the received signal. During transmission, the wireless transceiver 202 channel-codes and spreads data, up-converts a signal and transmits the signal via the antenna.

The memory 203 may store a function set between the touch screen and the additional key button defined by a user according to an embodiment of the present disclosure.

The touch screen 205 detects input information input by the user and provides the same to the controller 201, and displays output information provided from the controller 201. In addition, according to an embodiment of the present disclosure, the touch screen 205 detects an operation touched by the user and provides the same to the controller 201.

The additional key input unit 206 detects an input of additional key buttons installed on a pertinent position of the device excluding the touch screen 205 and provides a control signal to the controller 201.

The controller 201 controls an overall operation of the mobile terminal 100 and simultaneously detects a constant touch of the touch screen according to an embodiment of the present disclosure, and performs a new additional function according to an input signal provided by the additional key input unit 206 together with the constant touch. For example, when detecting an input of the additional key button within a predetermined time with the touch screen 205 touched constantly, the controller 201 may perform a new function corresponding to the input of the additional key button. Preferably, when detecting an input of a volume up/down key button within a predetermined time with the touch screen touched, the controller may perform a new different function other than a volume up/down function. For example, the new function may be a brightness control function of the touch screen.

FIG. 3 illustrates a flowchart for a touch input method for performing an additional function according to an embodiment of the present disclosure.

As illustrated in FIG. 3, the controller determines whether a touch input by a user exists in block 301. When the touch input exists, the controller detects a touch operation in block 302. The controller determines whether an input of an additional key button installed at a portion excluding the touch screen of the mobile terminal exists within a touch input set time in block 303. When not detecting the input of the additional key button, the controller proceeds to block 305 to perform a relevant function.

However, when detecting an input of the additional key button within a predetermined time during a touch input in block 303, the controller determines a function of the input additional key button in block 307, and performs a new function excluding a unique function of the additional key button in block 309. For example, when detecting input of the additional key button within 1 second~2 second, 0.5 second~1 second, or 0.5 second~1.5 second during a constant touch input, the controller may perform a new function. However, when a single touch is performed or 2 seconds elapse during a constant touch input, the controller may perform a different relevant function.

For the above relevant function, when detecting a volume up/down key button during a constant touch input, the controller may perform various functions such as controlling the brightness of the touch screen, for example, or storing a current screen shot when detecting an input of a power button during a constant touch input.

Though not shown, a function definition for a constant touch input of the touch screen and an input of the additional key button may be set by a user separately.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. An input method for an electronic device, the method comprising:
   detecting an input of a key button of the electronic device;
   when the input of the key button is detected without a maintained touch input on a touch screen, performing a first function based on the input of the key button;
   when the input of the key button is detected with the maintained touch input on the touch screen within a predetermined range of time of the maintained touch input on the touch screen, performing a second function, based on both the maintained touch input and the input of the key button, that is different than the first function; and
   when the input of the key button is detected with the maintained touch input on the touch screen after the predetermined range of time of the maintained touch input on the touch screen, invalidating the maintained touch input and performing the first function based on the input of the key button.

2. The method of claim 1, wherein the second function comprises controlling a brightness of the touch screen.

3. The method of claim 1, wherein the predetermined range of time of the maintained touch input comprises a range of 0.5 second~2 seconds.

4. The method of claim 1, wherein the second function comprises storing a captured image of a currently displayed screen.

5. The method of claim 1, further comprising:
   storing functions of newly defined key buttons input from a user.

6. The method of claim 1, wherein the electronic device comprises a wireless mobile communication terminal.

7. The method of claim 1, wherein the key button comprises one of a volume up/down key button, a power on/off button, and a sleep mode release button.

8. An electronic device, the electronic device comprising:
   a touch screen configured to perform data input and output;
   a key button installed at a position of the electronic device that excludes the touch screen; and
   a controller configured to:
      when the input of the key button is detected without a maintained touch input on the touch screen, control to perform a first function based on the input of the key button;
      when the input of the key button is detected with the maintained touch input on the touch screen within a predetermined range of time of the maintained touch input on the touch screen, control to perform a second function that is different than the first function based on both the maintained touch input and the input of the key button; and
      when the input of the key button is detected with the maintained touch input on the touch screen after the predetermined range of time of the maintained touch input on the touch screen, control to invalidate the maintained touch input and control to perform the first function.

9. The electronic device of claim 8, wherein the second function comprises controlling a brightness of the touch screen.

10. The electronic device of claim 8, wherein the predetermined range of time of the maintained touch input comprises a range of 0.5 second~2 seconds.

11. The electronic device of claim 8, wherein the second function comprises storing a captured image of a currently displayed screen.

12. The electronic device of claim 8, further comprising a memory configured to store functions of newly defined key buttons input from a user.

13. The electronic device of claim 8, wherein the electronic device comprises a wireless mobile communication terminal.

14. The electronic device of claim 13, wherein the key button comprises one of a volume up/down key button, a power on/off button, and a sleep mode release button.

15. A method for an electronic device, the method comprising:
   detecting an input of a key button of the electronic device other than a touch screen;
   when the input of the key button is detected without a maintained touch input on the touch screen, performing a first function based on the input of the key button;
   when the input of the key button is detected with the maintained touch input on the touch screen within a predetermined range of time of the maintained touch input on the touch screen, performing a second function, based on both the maintained touch input and the input of the key button, that is different than the first function; and
   when the input of the key button is detected with the maintained touch input on the touch screen after the predetermined range of time of the maintained touch input on the touch screen, invalidating the maintained touch input and performing the first function based on the input of the key button.

16. The method of claim 15, wherein the second function comprises controlling a brightness of the touch screen.

17. The method of claim 15, wherein the predetermined range of time of the maintained touch input comprises a range of 0.5 second~2 seconds.

18. The method of claim 15, wherein the second function comprises storing a captured image of a currently displayed screen.

19. The method of claim 15, further comprising:
    storing functions of newly defined key buttons input from a user.

20. The method of claim 15, wherein the key button comprises one of a volume up/down key button, a power on/off button, and a sleep mode release button.

* * * * *